US012462532B2

(12) United States Patent
Sundareshan et al.

(10) Patent No.: US 12,462,532 B2
(45) Date of Patent: Nov. 4, 2025

(54) ENRICHING LATER-IN-TIME FEATURE MAPS USING EARLIER-IN-TIME FEATURE MAPS

(71) Applicant: Motional AD LLC, Boston, MA (US)

(72) Inventors: Balaji Sundareshan, Boston, MA (US); Akankshya Kar, Santa Monica, CA (US); Varun Kumar Reddy Bankiti, Bellevue, WA (US)

(73) Assignee: Motional AD LLC, Boston, MA (US)

( * ) Notice: Subject to any disclaimer, the term of this patent is extended or adjusted under 35 U.S.C. 154(b) by 308 days.

(21) Appl. No.: 17/929,405

(22) Filed: Sep. 2, 2022

(65) Prior Publication Data

US 2024/0078790 A1   Mar. 7, 2024

(51) Int. Cl.
| | |
|---|---|
| G06V 10/00 | (2022.01) |
| G01C 21/00 | (2006.01) |
| G06V 10/74 | (2022.01) |
| G06V 10/77 | (2022.01) |
| G06V 20/58 | (2022.01) |
| B60W 60/00 | (2020.01) |

(52) U.S. Cl.
CPC ..... *G06V 10/7715* (2022.01); *G01C 21/3822* (2020.08); *G06V 10/761* (2022.01); *G06V 20/58* (2022.01); *B60W 60/001* (2020.02); *B60W 2420/403* (2013.01); *G06V 2201/08* (2022.01)

(58) Field of Classification Search
CPC .. G06V 10/7715; G06V 10/761; G06V 20/58; G06V 2201/08; G06V 10/806; G06V 20/56; G06V 10/454; G01C 21/3822; B60W 60/001; B60W 2420/403
See application file for complete search history.

(56) References Cited

FOREIGN PATENT DOCUMENTS

CN    110916701 A  *  3/2020  ............. A61B 5/055

OTHER PUBLICATIONS

Fujitake et al., Temporal feature enhancement network with external memory for object detection in surveillance video, 2020 25th International Conference on Pattern Recognition (ICPR), pp. 7684-7691, Jan. 10-15 (Year: 2021).*
Deng et al., Single Shot Video Object Detector, IEEE Transactions on Multimedia, vol. 23, pp. 846-858. (Year: 2021).*
Sabet et al., Temporal early exits for efficient video object detection arXiv 2106.11208v1 (Year: 2021).*
Han et al., VISOLO: Grid-Based Space-Time Aggregation for Efficient Online Video Instance Segmentation, IEEE/CVF Conference on Computer Vision and Pattern Recognition, pp. 2886-2895, June (Year: 2022).*
Perreault et al., RN-VID: A Feature Fusion Architecture for Video Object Detection, arXiv 2003.10898v2 (Year: 2020).*

(Continued)

*Primary Examiner* — Xiao Liu
(74) *Attorney, Agent, or Firm* — Knobbe, Martens, Olson & Bear, LLP

(57) ABSTRACT

A system may be used to determined object characteristics and/or generate bounding boxes for objects in a vehicle scene by enriching later-in-time feature maps using earlier-in-time feature maps. The system may generate a feature map from a received. Using an earlier-in-time feature map, the system may enrich semantic data of the generated feature map to form an enriched feature map. The system may use the enriched feature map to generate one or more object characteristics of an object in the scene.

17 Claims, 11 Drawing Sheets

(56) References Cited

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Tian, Z. et al., "FCOS: Fully Convolutional One-Stage Object Detection", 2019 IEEE/CVF International Conference on Computer Vision (ICCV), Oct. 27-Nov. 2, 2019, in 13 pages. URL: https://doi.org/10.48550/arXiv.1904.01355.

Deng, J. et al., "Single Shot Video Object Detector", IEEE Transactions on Multimedia, 2021, vol. 23, pp. 846-858.

Fujitake, M. et al., "Temporal feature enhancement network with external memory for object detection in surveillance video", 2020 25th International Conference on Pattern Recognition (ICPR), Jan. 10-15, 2021, pp. 7684-7691.

Han, S. H. et al., "VISOLO: Grid-Based Space-Time Aggregation for Efficient Online Video Instance Segmentation", 2022 IEEE/CVF Conference on Computer Vision and Pattern Recognition, Jun. 2022, pp. 2886-2895.

International Search Report and Written Opinion received for PCT Patent Application No. PCT/US2023/031755, mailed on Nov. 3, 2023.

International Preliminary Report on Patentability received for PCT Application No. PCT/US2023/031755, mailed on Mar. 13, 2025.

\* cited by examiner

ENRICHING LATER-IN-TIME FEATURE MAPS USING EARLIER-IN-TIME FEATURE MAPS

BACKGROUND

Self-driving vehicles may determine object characteristics and/or generate bounding boxes for objects in a vehicle scene using images obtained from one or more image sensors.

DETAILED DESCRIPTION

Figure 1:
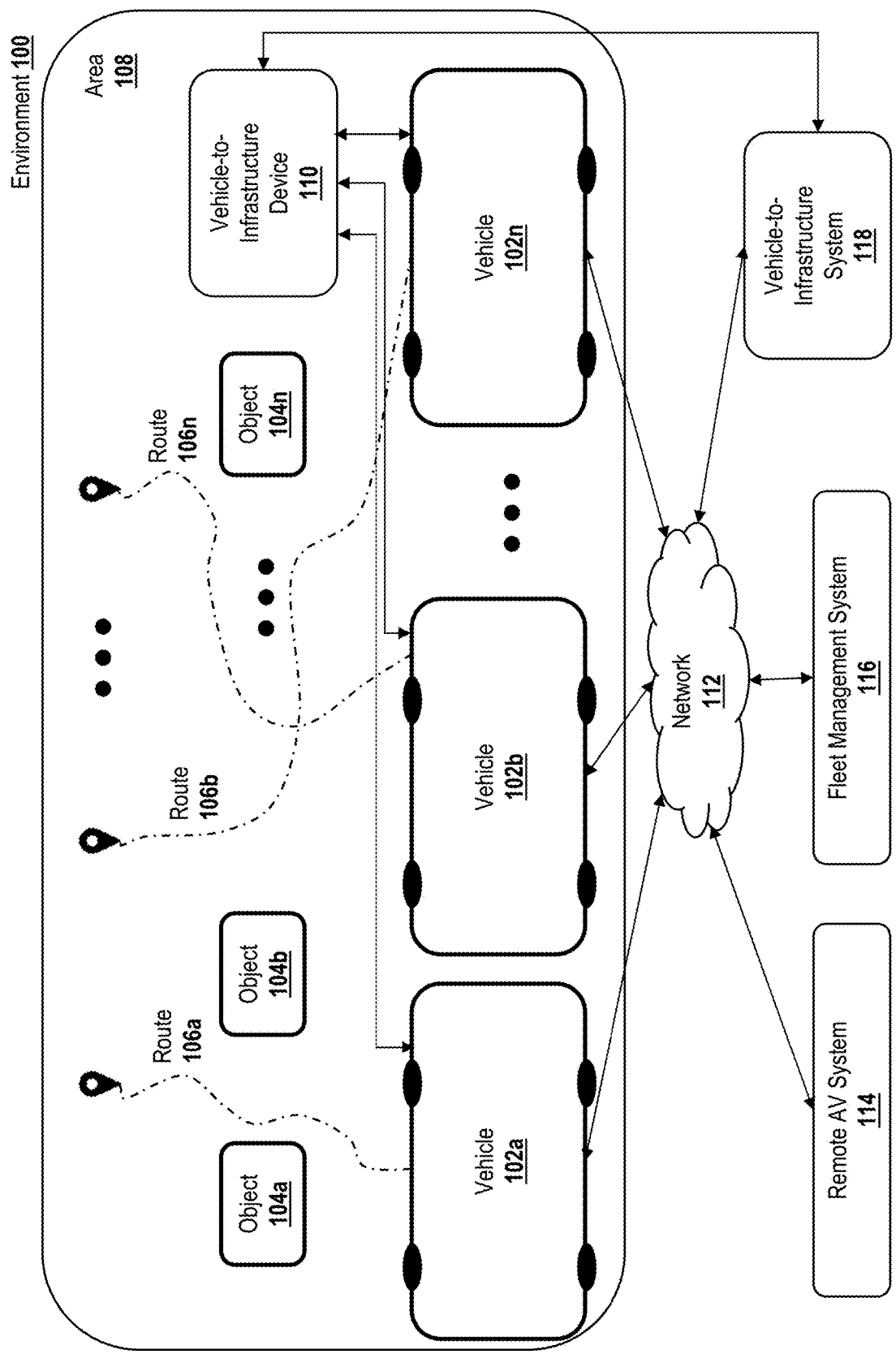
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. Also, the term "or" is used in its inclusive sense (and not in its exclusive sense) so that when used, for example, to connect a list of elements, the term "or" means one, some, or all of the elements in the list. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. As used herein, the term "if" is, optionally, construed to mean "when," "upon," "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has," "have," "having," or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

Overview

To effectively navigate through various scenes, autonomous vehicles use computer vision to identify objects in a scene and then navigate the scene based on the identified objects. As part of the navigation process, the autonomous vehicles may determine characteristics of objects (e.g., depth, velocity, direction, size, etc.) in images and/or draw (3D) bounding boxes around the objects to understand the spatial relationship of the object to the autonomous vehicle and navigate a path through the scene.

It can be challenging to accurately determine object characteristics and draw accurate 3D bounding boxes on objects in a real-time driving environment, in some cases, because a neural network is unable to obtain enough semantic and local information about the objects.

To address these issues, an autonomous vehicle may generate multiple feature maps using multiple images in an image stream from the same image sensor (e.g., from successive images), and use the feature maps generated from earlier images (also referred to herein as earlier feature maps or earlier-in-time feature maps) to enrich the feature maps of later images (also referred to herein as later feature maps or later-in-time feature maps).

By using earlier-in-time feature maps to enrich later-in-time feature maps, the autonomous vehicle can generate feature maps with additional (or richer) data. This may improve the autonomous vehicle's ability to determine characteristics of objects within the autonomous vehicle's scene, bounding boxes, and/or object trajectories. For example, the enriched later-in-time feature maps can improve the autonomous vehicle's ability to determine objects' depth, velocity, centerness, etc., and determine accurate bounding boxes. In turn, the improved characteristics and/or bounding boxes may increase the autonomous vehicle's ability to navigate a particular scene safely (e.g., without collision) or more comfortably (e.g., avoiding large acceleration/deceleration).

General Overview

By virtue of the implementation of systems, methods, and computer program products described herein, an autonomous vehicle can more accurately identify objects within an image, more accurately identify the location of identified objects within the image, more accurately predict trajectories of identified objects within the image, determine additional features for identified objects, and infer additional information about the scene of an image.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
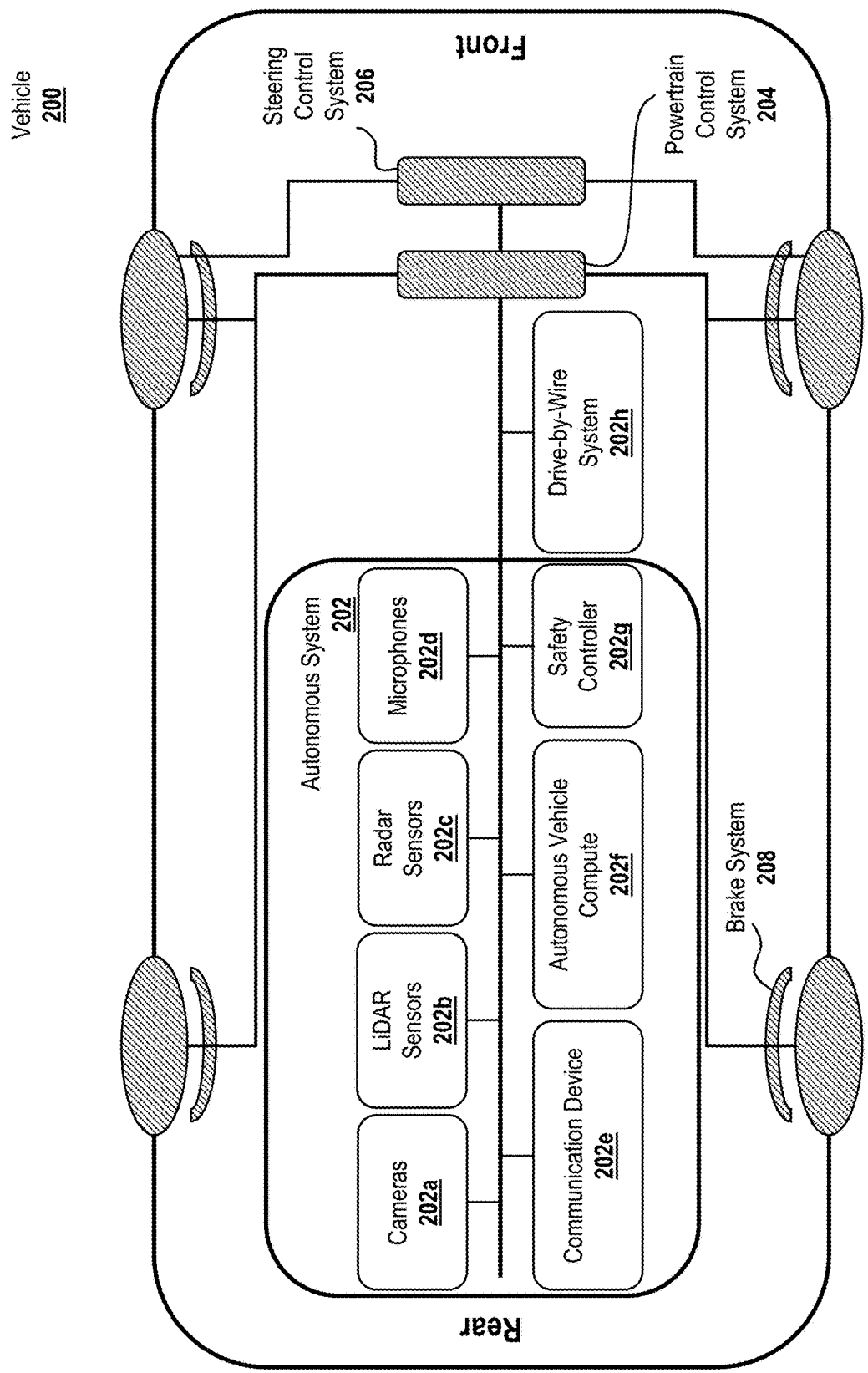
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
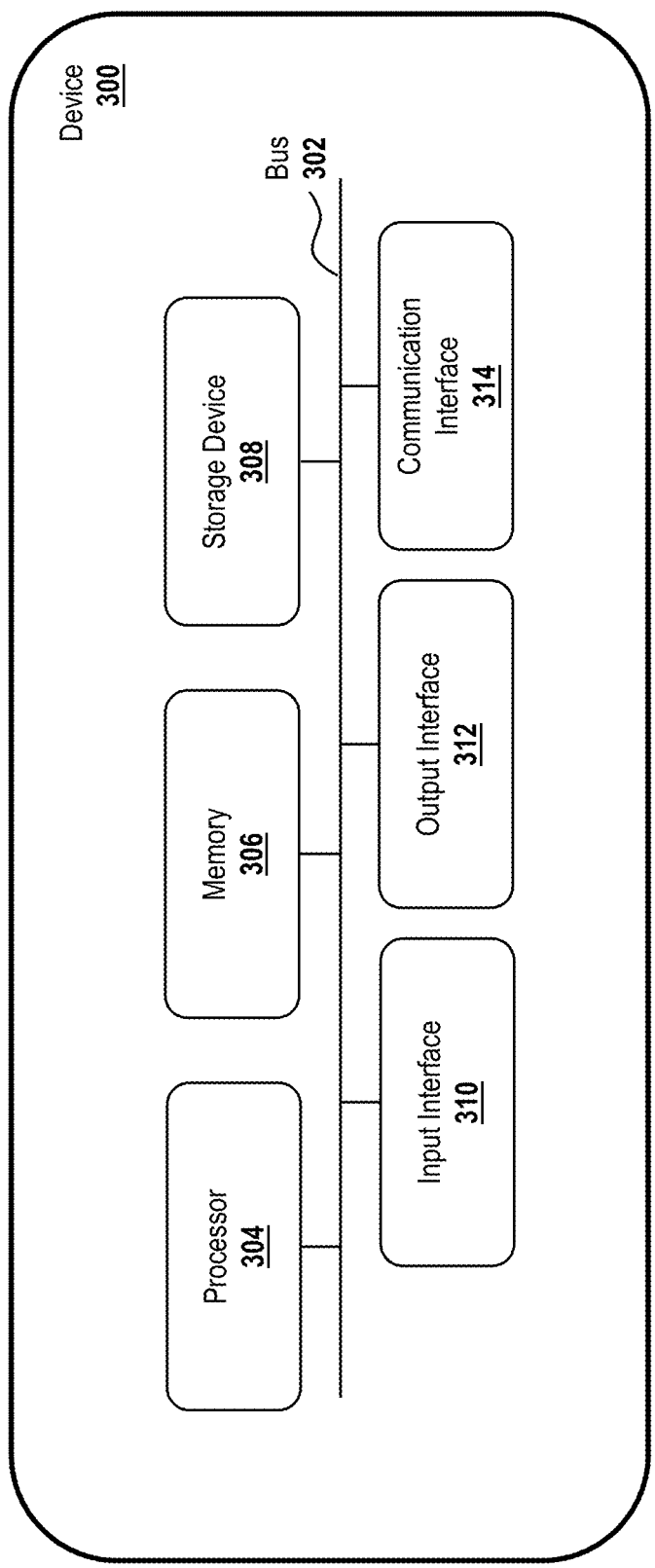
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 306 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4A:
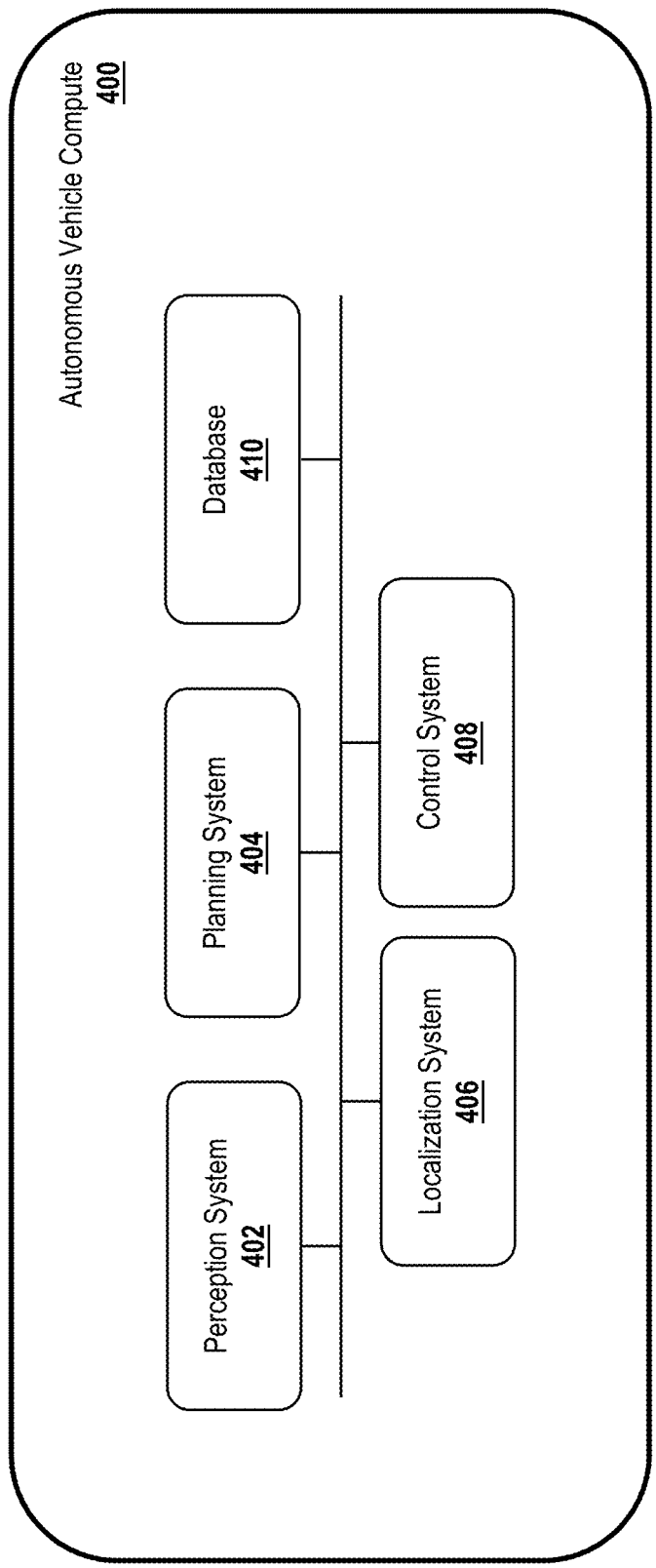
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
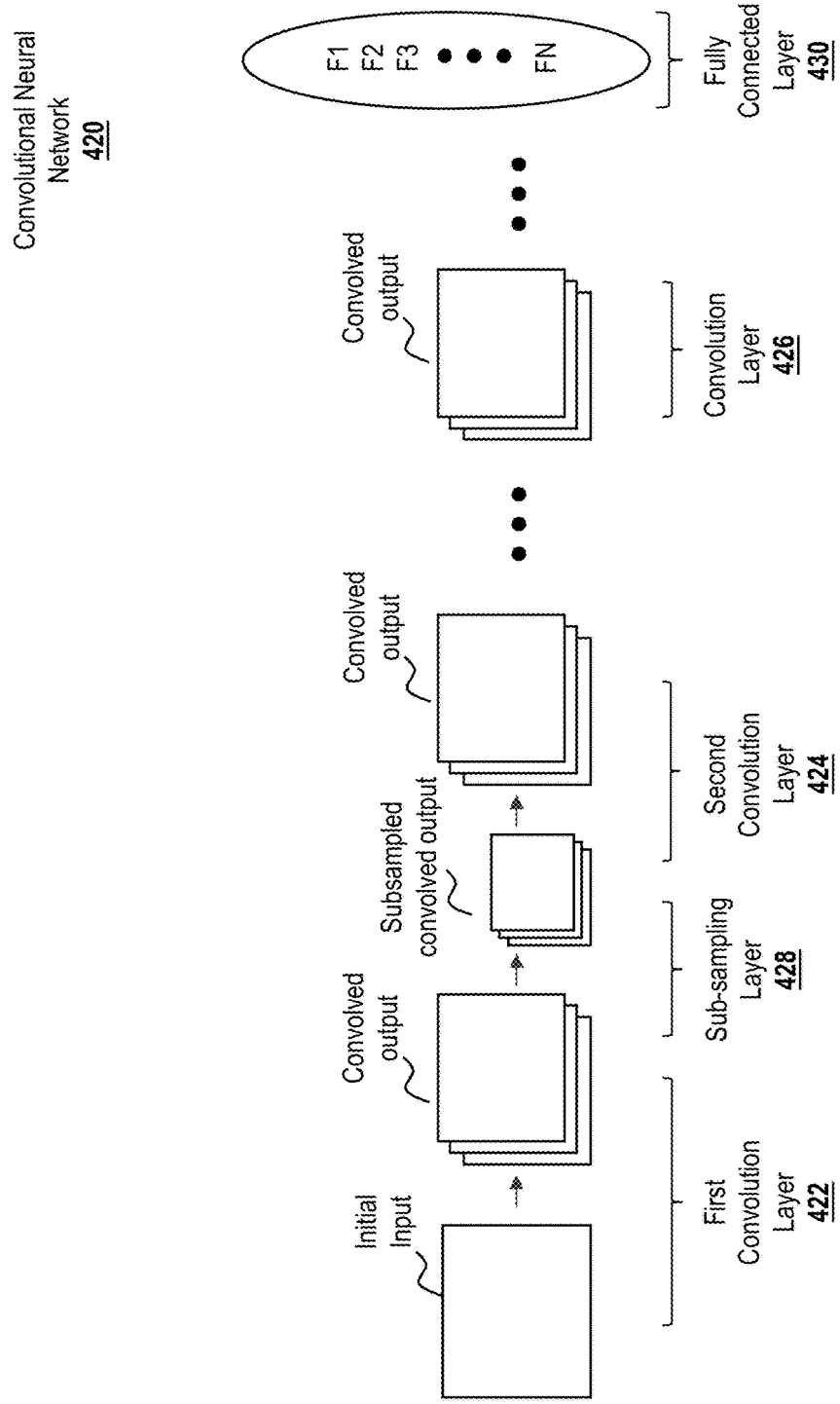
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
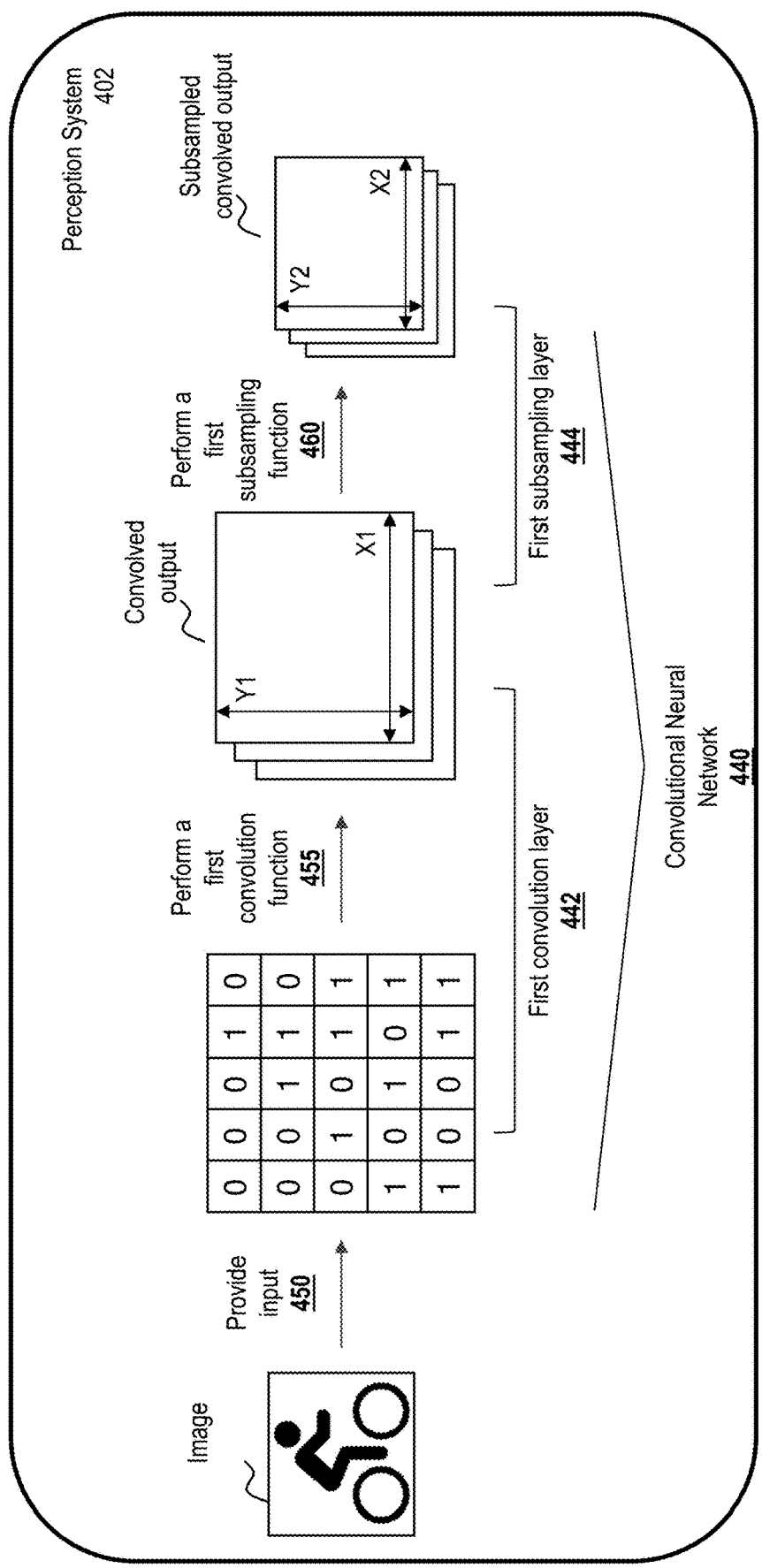
FIGS. 4C and 4D are a diagram illustrating example operation of a CNN.
Figure 4D:
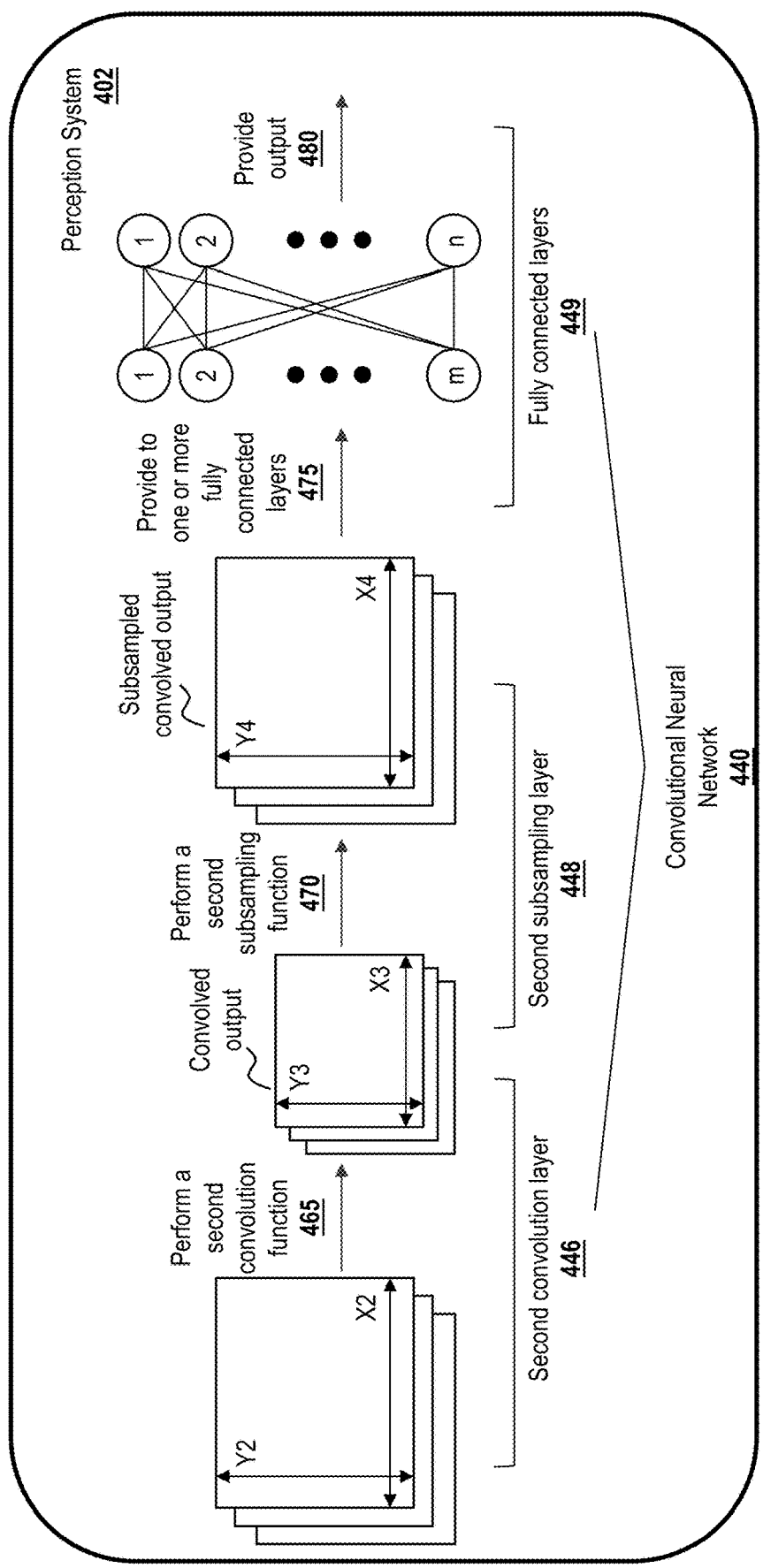

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Generating Bounding Boxes for Navigation

As described herein, to improve the functionality of an autonomous vehicle and its ability to determine characteristics of objects in a scene, generate bounding boxes and/or navigate environments in real-time, an autonomous vehicle may be configured to use earlier-in-time feature maps to enrich later-in-time feature maps. By enriching later-in-time feature maps using earlier-in-time feature maps, the semantic data of the earlier-in-time feature maps may provide context to the later-in-time feature maps that enables the autonomous vehicle to more accurately detect objects and determine characteristics (e.g., depth, velocity, classification, size, offset, rotation, direction, etc.) of those objects and/or generate bounding boxes for those objects.

Figure 5:
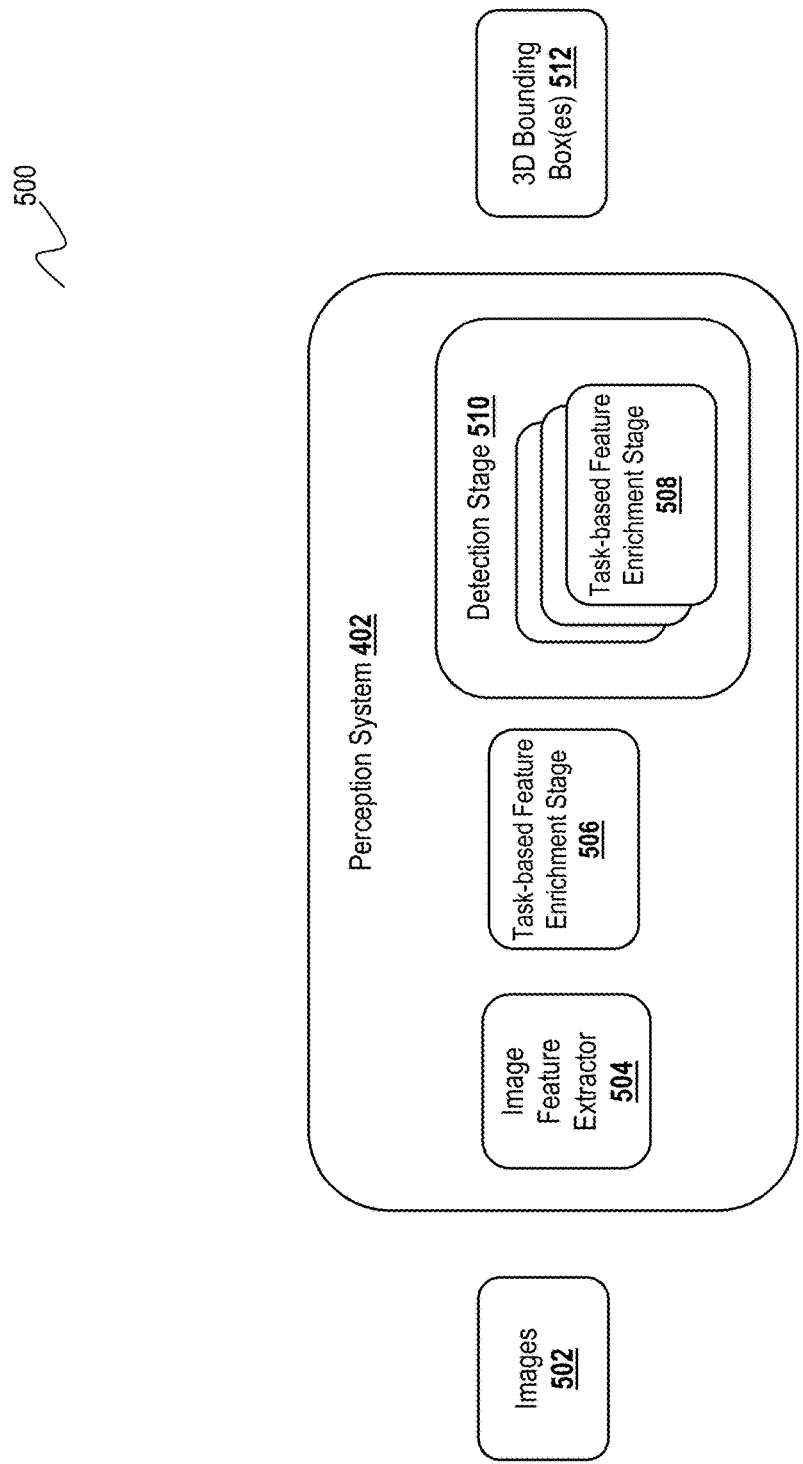
FIG. 5 is a block diagram illustrating an example perception environment in which a perception system receives and processes images to determine one or more characteristics for objects in a vehicle scene.

FIG. 5 is a block diagram illustrating an example perception environment 500 in which the perception system 402 receives and processes images 502 to provide one or more object characteristics or (3D) bounding boxes 512 for objects in a vehicle scene (corresponding to the images 502). In the illustrated example, the perception system 402 includes an image feature extractor 504, a task-based feature enrichment stage 506, and a detection stage 510 (having at least one task-based feature enrichment stage 508). However, it will be understood that the perception system 402 may include fewer or more components. In some cases, the perception system 402 may omit the task-based feature enrichment stage 506. For example, in some cases, the detection stage 510 may receive as an input, the output of the image feature extractor 504. In some such cases, one or more task-based feature enrichment stages 508 may enrich one or more feature maps as part of the detection stage 510. In certain cases, the perception system 402 may omit the task-based feature enrichment stages 508.

The images 502 (also referred to herein as a set of images 502, stream of images, or image stream) may include image data from a particular sensor in a sensor suite. The type of images may correspond to the image sensor used to generate the images 502. For example, the images 502 may be camera images generated from one or more cameras, such as cameras 202*a*, or lidar images generated from one or more lidar sensors, such as lidar sensors 202*b*. Other image types may be used, such as radar images generated from one or more radar sensors (e.g., generated from radar sensors 202*c*).

In some cases, a set of images may correspond to a stream of images from the same image sensor over time. Accordingly, a first image in the set of images may be generated (or captured) by the image sensor at time $t_0$, a second image in the set of images may be generated (or captured) at time $t_1$, etc. As the perception system 402 uses the images 502 to determine object characteristics and/or generate bounding boxes 512 and navigate a vehicle, it will be understood that the perception system 402 may process the images 502 in real-time or near real-time to generate the object characteristics and/or the bounding boxes 512.

Moreover, as there may be multiple image sensors, each image sensor may produce its own set (or stream) of images. Accordingly, images from different streams of images may be generated at approximately the same time. As such, images from different image streams taken at the same time may represent the scene of a vehicle at that time.

The image feature extractor 504 may be implemented using one or more neural networks or layers of a neural network to extract features from the images 502. In some cases, the image feature extractor 504 may be implemented using backbones with a feature pyramid network (FPN), residual networks (Resnet), or Swin transformer, CSWin transformer, etc.

The image feature extractor 504 may generate one or more feature maps using the images 502. In some cases, the image feature extractor 504 generates at least one feature map for each of the images 502. For example, if the image feature extractor 504 receives six successive images from an image stream, the image feature extractor 504 may generate six feature maps, respectively.

The feature maps may have the same or different shapes from the images used to generate them and/or from each other. For example, if each of the images 502 has the shape [900, 1600, 3], respective feature maps may have the shape [45, 80, 256], however, it will be understood that the feature maps may have different shapes or even different shapes from each other.

Each feature map of the generated feature maps may include an array of grid cells having a particular channel depth. The grid cells may include semantic data (or features) extracted from (pixels in) the image(s) from which the feature map was generated. The features of a grid cell may be organized as a vector or some other tensor shape. For example, the features (or semantic data) of a grid cell may indicate a shape, light, texture, reflectivity, edge, object class, location, etc. of something detected by the image feature extractor 504.

In certain cases, the image feature extractor 504 may generate multiple feature maps for each image. For example, the image feature extractor 504 may include a FPN that generates multiple feature maps from a particular image. In some cases, some of the feature maps (e.g., of the multiple feature maps generated from the particular image) may be generated from each other. For example, a first feature map may be downsampled (or convolved) to generate a second feature map, and the second feature map may be downsampled (or convolved) to generate a third feature map and so on. In some such cases, the second feature map may have a smaller height and width than the first feature map, and the third feature map may have a smaller height and width than the second feature map, etc.

It will be understood that the description herein related to the processing of one feature map generated from an image may also be performed on some or all feature maps generated from the image. For example, if the image feature extractor 504 outputs five feature maps generated from a particular image (e.g., corresponding to different feature levels), the task-based feature enrichment stage 506 and/or detection stage 510 may enrich some or all of the five feature maps using corresponding feature maps generated from previous images, as described herein. Thus, it will be understood that the perception system 402 may perform multiple iterations of enrichment on multiple feature maps generated from one image 502.

Task-Based Feature Enrichment Stage

The task-based feature enrichment stage 506 may enrich feature maps. In certain cases, the task-based feature enrichment stage 506 may enrich later feature maps using earlier feature maps. For example, the task-based feature enrichment stage 506 may use one or more earlier-in-time feature maps to enrich a later-in-time feature map. The earlier feature maps may include a feature map corresponding to an image that immediately precedes the image used to generate the later feature map (e.g., the image that was generated/taken just before the image corresponding to the feature map to be enriched). For example, the task-based feature enrichment stage 506 may use the feature map corresponding to an image at time $t_0$ to enrich the feature map corresponding to an image generated at time $t_1$. Similarly, the task-based feature enrichment stage 506 may use feature maps corresponding to images generated at time $t_0$, $t_1$, and $t_2$ to enrich the feature map corresponding to an image generated at time $t_3$, and so forth. However, it will be understood that any combination earlier feature maps may be used to enrich a later feature map. For example, the task-based feature enrichment stage 506 may use feature maps corresponding to images generated at time $t_0$ and/or $t_2$ to enrich the feature map corresponding to an image generated at time $t_4$, etc.

Moreover, the task-based feature enrichment stage 506 may use an earlier feature map to enrich multiple later feature maps. For example, the task-based feature enrichment stage 506 may use a feature map corresponding to an image generated at time $t_0$, to enrich the feature maps corresponding to images generated at time $t_1$, $t_2$, and/or $t_3$, etc.

In some cases, the task-based feature enrichment stage 506 may weight the semantic data of the earlier feature map and may use the weighted semantic data to modify the semantic data of the later feature map. In certain cases, the task-based feature enrichment stage 506 may weight the semantic data of an earlier feature map depending on the difference in time between its corresponding image and the image corresponding to the later feature map. For example, the task-based feature enrichment stage 506 may give less weight to semantic data from a feature map with a greater distance in time used to enrich a particular feature map than semantic data from a feature map with a smaller distance in time from the feature map to be enriched. As another non-limiting example, if the task-based feature enrichment stage 506 uses feature_map0, feature_map1, and feature_map2 (corresponding to images generated at time $t_0$, $t_1$, and $t_2$) to enrich feature_map3, the task-based feature enrichment stage 506 may weight the semantic data of feature_map0, feature_map1, and feature_map2 such that semantic data of feature_map2 has a greater effect on the value of enriched feature_map3 than feature_map0 or feature_map1. Similarly, the task-based feature enrichment stage 506 may weight feature_map1 such that semantic data of feature_map1 has a greater effect on the value of enriched feature_map3 than feature_map0. However, it will be understood that the semantic data of feature maps may be weighted in a variety of ways (including not weighted relative to each other), etc.

The task-based feature enrichment stage 506 may enrich a feature map in a variety of ways using one or more earlier feature maps. In certain cases, the task-based feature enrichment stage 506 may enrich a later feature map by concatenating semantic data from at least one earlier feature map to corresponding semantic data of the later feature map and/or cross-attending semantic data of a later feature map with semantic data of earlier feature maps.

In some cases, the task-based feature enrichment stage 506 may identify one or more grid cells in an earlier feature map that correspond to a grid cell in a later feature map and use semantic data of the identified grid cell(s) in the earlier feature map to enrich or modify semantic data of the corresponding grid cell in the later feature map.

In certain cases, the task-based feature enrichment stage 506 may map grid cells based from the earlier feature map to the later feature map based on the location of the grid cells in the earlier feature map. In certain cases, grid cells at the same location of different feature maps may be mapped to each other. For example, the task-based feature enrichment stage 506 may map a grid cell at location (5, 25) of an earlier feature map to (and use to enrich) the grid cell at location (5, 25) of the later feature map.

In some cases, the task-based feature enrichment stage 506 may use localization data associated with the vehicle 200 to identify a grid cell in the earlier feature map to map to a particular grid cell in the later feature map. For example, the task-based feature enrichment stage 506 may take into account the time between the images corresponding to the earlier and later feature maps, the velocity, heading, and location of the vehicle 200, etc. to identify the grid cell(s) in the earlier feature map that corresponds to (or maps to) the grid cell in the later feature map.

In certain cases, the task-based feature enrichment stage 506 may use a learnable shifting value to identify the grid cell in the earlier feature map that corresponds to the grid cell in the later feature map. For example, a neural network may be trained to determine a shifting value between pixels across time based on various parameters of the vehicle and/or the images (e.g., vehicle velocity, vehicle direction, time between images, etc.). The learned shifting value may be applied to an earlier feature map to determine which grid cells in it corresponds to (or should be used to enrich) a grid cell of a later feature map.

In some cases, such as when a later feature map is enriched by concatenating semantic data of the later feature map with semantic data of an earlier feature map, the task-based feature enrichment stage 506 may append semantic data from the earlier feature map to some or all of the grid cells of the later feature map. For example, the task-based feature enrichment stage 506 may identify a grid cell in the earlier feature map that corresponds to a grid cell in the later feature map and append the semantic data from the identified grid cell in the earlier feature map to the semantic data of the grid cell in the later feature map.

In some cases, the task-based feature enrichment stage 506 may correlate semantic data of grid cell(s) in a later feature map with one or more grid cells of an earlier feature map. As part of correlating the grid cells from the different feature maps, the task-based feature enrichment stage 506 may use one or more linear layers to identify the corresponding grid cell(s) in the earlier feature map. For example, the task-based feature enrichment stage 506 may multiply a tensor [1, N] corresponding to the grid cell by a learnable linear layer matrix [N, 2] to determine a location of one or more grid cells in the earlier feature map that corresponds to the grid cell in the later feature map.

The task-based feature enrichment stage 506 may use the features of the grid cell(s) from the earlier feature map (also referred to herein as mapped grid cells) to modify some or all of the features of the grid cell in the later feature map (also referred to herein as a target grid cell). In some cases, this may include assigning a weight to a particular feature of the target grid cell in the later feature map and a weight to a corresponding feature of the mapped grid cell(s) in the earlier feature map and using the result (non-limiting example: sum of the products) to modify or assign a new value to the particular feature of the target grid cell in the later feature map. In certain cases, the task-based feature enrichment stage 506 may use a learnable linear layer matrix to identify multiple grid cells of an earlier feature map and use the identified grid cells to modify the features of the grid cell of the later feature map. In some such cases, the task-based feature enrichment stage 506 may assign different weights to the features of the different grid cells and use the weighted features to determine a corresponding feature of the target grid cells.

As described herein, multiple earlier feature maps may be used to enrich a later feature map. In some such cases, the task-based feature enrichment stage 506 may map the grid cells from each of the earlier feature maps (mapped grid cells) to target grid cells of the later feature maps, and use the combination of mapped grid cells from the different feature maps to enrich or modify the features of the target grid cell. In some such cases, the task-based feature enrichment stage 506 may apply a weighting value to the different earlier feature maps (e.g., based on a time difference from the later feature map) and apply a weighting value to one or more grid cells of the different earlier feature maps (e.g., based on a determined relationship between the one or more mapped grid cells and the target grid cell of the later feature map). Moreover, if multiple feature maps are to be enriched (e.g., because the image feature extractor 504 generates multiple feature maps from the image), the enrichment process may be performed for some or all of the multiple feature maps to be enriched.

Detection Stage

The detection stage 510 uses the output of the image feature extractor 504 and/or task-based feature enrichment stage 506 to determine one or more characteristics of objects in the images 502 and/or to generate one or more bounding boxes 512 for the objects in the images 502. The characteristics of the object may include, but are not limited to, object classification, object location, object depth, object centerness, object size, object rotation, object direction, and/or object velocity. In some cases, the detection stage 510 may be implemented based on a fully convolutional one-stage object detection, a non-limiting example of which is described in "FCOS: Fully Convolutional One-Stage Object Detection," Tian et al., 2019 IEEE/CVF International Conference on Computer Vision (ICCV), 27 Oct. 2019-2 Nov. 2019, incorporated herein by reference, and which may be modified to enrich one or more feature maps using the task-based feature enrichment stages 508. However, it will be understood that a variety of detectors may be used as desired.

In some cases, the detection stage 510 may perform multiple convolutions on feature maps (e.g., output from the image feature extractor 504) or enriched feature maps (e.g., output by the task-based feature enrichment stage 506) to determine different characteristics of objects in an image. In some cases, the detection stage 510 may use different convolutions to generate different streams. For example, a first set of convolutions may form a classification stream that generates one or more feature maps to classify objects in an image and a second set of convolutions may form a regression stream that generates one or more feature maps that indicate particular characteristics of objects in an image (e.g., velocity, location, depth, centerness, size, rotation, and/or direction, etc.). Fewer or more streams may be used as desired.

In the illustrated example, the detection stage 510 includes one or more task-based feature enrichment stages 508. The task-based feature enrichment stages 508 may be similar to the task-based feature enrichment stage 506 in that they may enrich later feature maps using one or more earlier feature maps. Moreover, the task-based feature enrichment stages 508 may enrich feature maps in a manner similar to the task-based feature enrichment stage 506. For example, the task-based feature enrichment stages 508 may identify one or more grid cells in an earlier feature map that correspond to a particular grid cell (also referred to herein as a target grid cell) in a later feature map and use semantic data associated with the one or more grid cells in the earlier feature map to modify or enrich the semantic data of the target grid cell in the later feature map.

It will be understood, however, that the feature maps enriched by the task-based feature enrichment stages 508 may be different than the feature maps enriched by the task-based feature enrichment stage 506. For example, the feature maps enriched by the task-based feature enrichment stages 508 may be a different size than the feature maps enriched by the task-based feature enrichment stages 506.

As another non-limiting example, the feature maps enriched by the task-based feature enrichment stages 508 may correspond to feature maps generated from one or more of the convolutions of the detection stage 510. In some cases, the detection stage 510 may include task-based feature enrichment stage 508 to enrich feature maps after each, multiple, or a particular convolution in the detection stage 510. Accordingly, the detection stage 510 may perform one or more convolutions on a feature map output by the image feature extractor 504 or on an enriched feature map output by the task-based feature enrichment stage 506 (also referred to as a convolved output), and then use a task-based feature enrichment stage 508 to enrich the convolved output (feature map resulting from the one or more convolutions). In some such cases, the task-based feature enrichment stage 508 may use an earlier feature map that it previously enriched to enrich the convolved output (feature map resulting from the one or more convolutions). As mentioned, the enrichment of feature maps by a task-based feature enrichment stage 508 within the detection stage 510 may occur after each convolution, after a particular convolution or after multiple convolutions. Moreover, one or more task-based feature enrichment stages 508 may form part of different streams, such as part of a classification stream and/or a regression stream, etc.

As a non-limiting example, consider the scenario in which the detection stage 510 enriches a feature map. Based on an image at time $t_0$, the perception system 402 may generate a first $t_0$ feature map using the image feature extractor 504 and generate a second $t_0$ feature map using the detection stage 510 (as a result of one or more convolutions of the first $t_0$ feature map). Later, based on an image at time $t_1$, the perception system 402 may generate a first $t_1$ feature map using the image feature extractor 504, a second $t_1$ feature map using the detection stage 510 (as a result of one or more convolutions of the first $t_1$ feature map), and an enriched $t_1$ feature map using the second to feature map and the second $t_1$ feature map.

As another non-limiting example consider the scenario in which a feature map output by the image feature extractor 504 is enriched. Based on an image at time $t_0$, the perception system 402 may generate a first to feature map using the image feature extractor 504 and generate a second to feature map using the detection stage 510 (non-limiting example: based at least in part on the first to feature map e.g., by performing one or more convolutions on an enriched version of the first to feature map). Later, based on an image at time $t_1$, the perception system 402 may generate a first $t_1$ feature map using the image feature extractor 504, an enriched $t_1$ feature map using the first to feature map and the first $t_1$ feature map, and a second $t_1$ feature map using the detection stage 510 (e.g., as a result of one or more convolutions of the enriched $t_1$ feature map).

As another non-limiting example, consider the scenario in which a feature map output by the image feature extractor 504 is enriched and feature maps in the detection stage 510 (in the same or different streams) are enriched. Based on an image at time $t_0$, the perception system 402 may generate a first to feature map using the image feature extractor 504 and generate second to feature map and a third to feature map using the detection stage 510 (e.g., as a result of one or more convolutions). Later, based on an image at time $t_1$, the perception system 402 may generate a first $t_1$ feature map using the image feature extractor 504, a first enriched $t_1$ feature map using the first to feature map and the first $t_1$ feature map, a second $t_1$ feature map using the first enriched $t_1$ feature map and the detection stage 510 (e.g., as a result of one or more convolutions of the enriched $t_1$ feature map), a second enriched $t_1$ feature map using the second to feature map and the second $t_1$ feature map, a third $t_1$ feature map using the first or second enriched $t_1$ feature map and the detection stage 510 (e.g., as a result of one or more convolutions on the first or second enriched $t_1$ feature map, which convolutions may be the same or different than the one or more convolutions used to generate the second $t_1$ feature map), and a third enriched $t_1$ feature map using the third to feature map and the third $t_1$ feature map.

Fewer, more or different components may be used as part of the perception system 402. For example, in some cases, the perception system 402 may omit the task-based feature enrichment stages 508. In some such cases, the detection stage 510 may determine characteristics of the objects without enriching the feature maps using the task-based feature enrichment stages 508. As another example, the perception system 402 may omit the task-based feature enrichment stage 506. In some such cases, feature maps output by the image feature extractor 504 may be communicated to the detection stage 510 and feature maps generated by the detection stage 510 may be enriched using one or more task-based feature enrichment stages 508 to determine characteristics of the objects. In some cases, the perception system 402 or other component of the vehicle 200 may include a buffer or data store to store the earlier feature maps used to enrich later feature maps.

Data Flow Examples

Figure 6A:
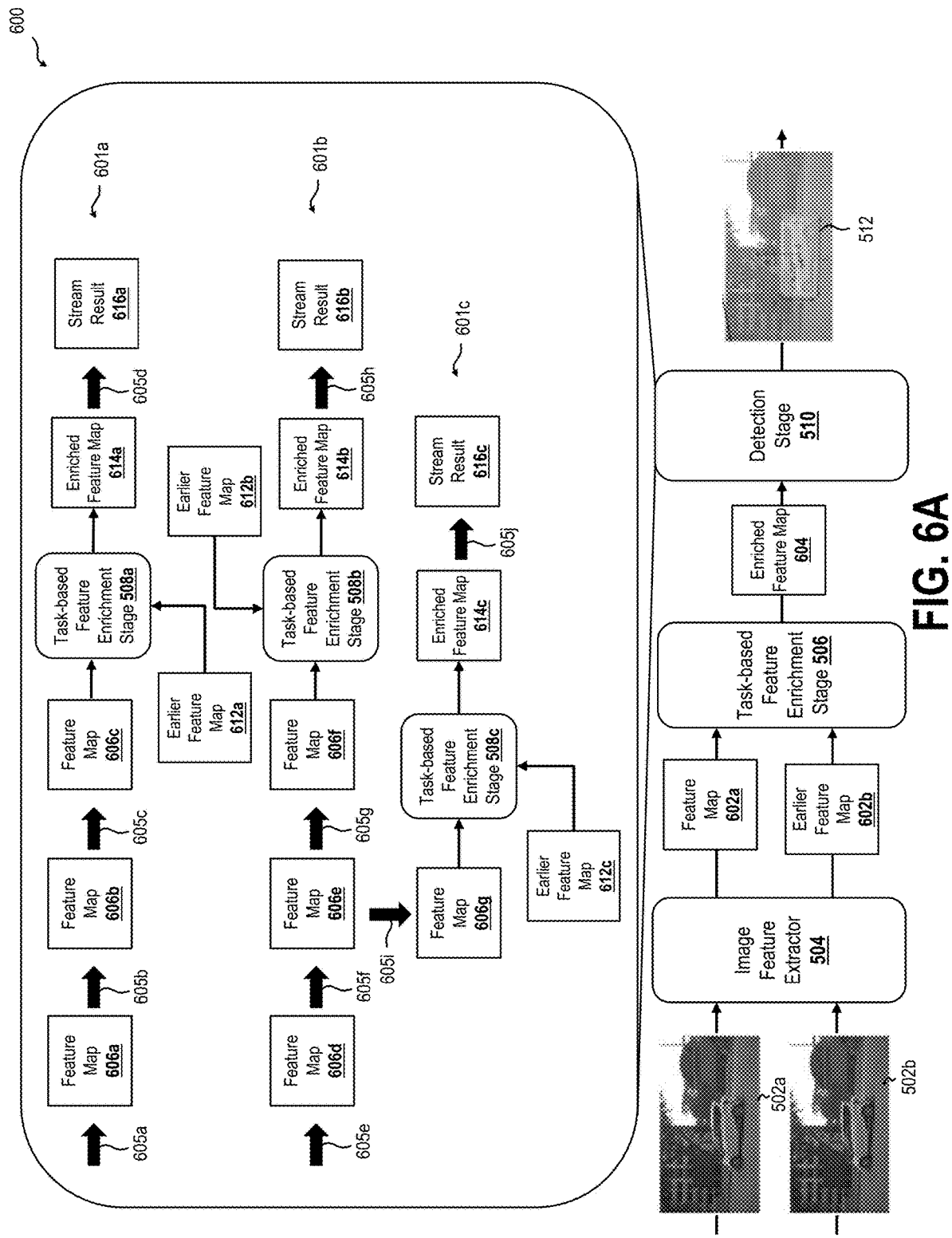
FIGS. 6A and 6B are data flows diagram illustrating examples of a perception environment in which a perception system determines one or more characteristics for objects in a vehicle scene.

FIG. 6A is a data flow diagram illustrating an example of a perception environment 600 in which a perception system 402 generates object characteristics and/or bounding boxes 512 from images 502 (individually identified as image 502a and image 502b).

As described herein, the images 502 may correspond to images received from the same image sensor at different times. For example, the image 502a may correspond to an image captured by an image sensor at time $t_1$ and the image 502b may correspond to an image captured by the image sensor at time $t_0$, however, it will be understood that fewer or more images may be used. The images 502 may correspond to images in an image stream taken right after each other or images with other images between them (e.g., sampled images). As described herein, the perception system 402 may repeatedly receive images and perform the functions described herein multiple times per second as new images are received. Accordingly, it will be understood that the perception system 402 may operate in real-time or near real-time to determine object characteristics and generate bounding boxes 512 from the images 502.

In the illustrated example, the image feature extractor 504 generates feature map 602a from the image 502a and generates the feature map 602b from the image 502b. In the illustrated example, the image feature extractor 504 generates one feature map from each of the images 502, however, it will be understood that the image feature extractor 504 may generate multiple feature maps 602 from each image of the images 502 (e.g., multiple levels of feature maps) and communicate the multiple feature maps 602 to the task-based feature enrichment stage 506.

As described herein, image feature extractor 504 may generate the feature map 602b prior to the feature map 602a, and in some cases before the image 502a is captured by the image sensor. In some such cases, the perception system 402 may store the earlier feature map 602b in a buffer or other data store before using it to enrich the feature map 602a.

Each feature map of the feature maps 602 may include an array of grid cells having a particular channel depth. The grid cells may include semantic data (or features) extracted from (pixels in) the image(s) 502 from which the feature map 602 was generated. The features may be organized as a vector or some other tensor shape. For example, the features (or semantic data) of a grid cell may indicate a shape, light, texture, reflectivity, edge, object class, location, etc., of something detected by the image feature extractor 504.

The task-based feature enrichment stage 506 may combine the feature maps 602 and/or use the earlier feature map 602b to enrich the later feature map 602a to form a first enriched feature map 604. In some cases, the task-based feature enrichment stage 506 may enrich the feature map 602a by modifying features in some or all of the grid cells of the feature map 602a using features from grid cells in the feature map 602b.

In some cases, the task-based feature enrichment stage 506 may enrich a grid cell of the feature map 602a by concatenating features from a corresponding grid cell in feature map 602b with the features of grid cells of the feature map 602a. In some such cases, the features of a grid cell at a particular location of the feature map 602b may be concatenated with the features of a grid cell at the same location of the feature map 602a. In certain cases, the task-based feature enrichment stage 506 may use a shifting value to identify corresponding grid cells between the feature maps 602 and use the identified corresponding grid cell(s) of the feature map 602b to enrich or modify the features of a target grid cell of the feature map 602a.

In some cases, the task-based feature enrichment stage 506 may include a cross-attention stage to identify grid cell(s) (e.g., of the feature map 602b) that correspond to a target grid cell of the feature map 602a and use the features of the identified grid cell(s) to modify the features of the target grid cell. As described herein, in some cases, this may include comparing features of grid cells in the different feature maps to determine a shift between grid cells (e.g., how much objects have moved between the images that correspond to the feature maps 602), using the determined shift to identify grid cells of the feature map 602b that correspond to the target grid cell of the feature map 602a, and using weighted features of the identified grid cell(s) from the feature map 602b to modify the features of the target grid cell from the feature map 602a. For example, the task-based feature enrichment stage 506 may identify grid cell(s) in the feature map 602b that correspond (or map) to a particular grid cell of the feature map 602a, weight the features, and/or use the (weighted) features of the identified grid cell(s) to modify or enrich the features of the particular grid cell of the feature map 602a. In some cases, the task-based feature enrichment stage 506 may use a similar technique to enrich some or all of the grid cells of the feature map 602a.

By enriching the grid cells of the feature map 602a using the grid cells of the feature map 602b, the perception system 402 may provide the detection stage 510 with more semantic data by which it can determine characteristics of objects in the image 502a (e.g., velocity) and generate bounding boxes 512. In some cases, the resulting enriched feature map may result in more accurate velocity calculations of objects, more accurate, bounding boxes 512, and/or more accurate trajectory predictions of those objects.

The detection stage 510 receives the enriched feature map 604 from the task-based feature enrichment stage 506 and uses the enriched feature map 604 to determine object characteristics and/or generate (3D) bounding boxes 512 for some or all of the objects in the image 502a. In some cases, the detection stage 510 generates bounding boxes for certain types of objects (e.g., objects with an object class of pedestrian, bicycle, vehicle, construction cone, etc.) but not others.

In the illustrated example of FIG. 6A, the detection stage 510 includes multiple convolution streams 601a, 601b, 601c (generically or collectively referred to as convolution stream 601). Each convolution stream 601 includes a set of (unique or shared) convolutions 605 (individually identified as convolutions 605a-605j) that generate feature maps (individually identified as feature maps 606a-606g) or a stream result 616 (individually identified as stream results 616a, 616b, or 616c), and a task-based feature enrichment stage 508 (individually identified as task-based feature enrichment stages 508a, 508b, 508c) that enriches a feature map 606 of a respective convolution stream 601 using an earlier feature map 612 (individually identified as earlier feature maps 612a, 612b, 612c) to generate an enriched feature map 614 (individually identified as enriched feature maps 614a, 614b, 614c).

Each of the earlier feature maps 612 may correspond to the image 502b. For example, each of the earlier feature maps 612 may be generated using the image 502b. In some cases, the earlier feature map 612 may be generated in a manner similar to the way in which the perception system 402 generates the feature maps that are to be enriched by the earlier feature map 612 (also referred to herein as a target feature map). For example, the earlier feature map 612a (used to enrich feature map 606c) may be generated by performing convolutions 605a, 605b, and 605c (the same convolutions used to generate feature map 606c) on a feature map generated from the image 502b (e.g., a previously generated enriched feature map and/or the feature map 602b). Similarly, the earlier feature map 612b (used to enrich feature map 606f) may be generated by performing convolutions 605e, 605f, and 605g (the same convolutions used to generate feature map 606f) on a feature map generated from the image 502b (e.g., a previously generated enriched feature map and/or the feature map 602b), and the earlier feature map 612c (used to enrich feature map 606g) may be generated by performing convolutions 605e, 605f, and 605i (the same convolutions used to generate feature map 606g) on a feature map generated from the image 502b (e.g., a previously generated enriched feature map and/or the feature map 602b), Accordingly, it will be understood that multiple earlier feature map 612 may be used to enrich multiple later feature maps 606 at different stages within the perception system 402 and/or within the detection stage 510. Moreover, it will be understood that if a target feature map (e.g., feature map 606c) includes multiple feature levels, that the earlier feature map 612a may also include multiple feature levels to enrich the multiple feature levels of the target feature map 606c, respectively.

The convolutions 605 may each vary from each other. As such, the content of the feature maps 606 and stream results 616 may each vary from each other. For example, even though the enriched feature map 604 may serve as the input to both of the convolutions 605a and 605e, the resulting feature maps 606a and 606d, respectively, may be different given the difference between the convolutions 605a and 605e. Accordingly, it will be understood that the detection stage 510 may generate multiple feature maps 606 from the enriched feature map 604.

In some cases, the various feature maps 606 may have the same (or different) size (e.g., height and width) and channel depth depending on the convolution 605. For example, the feature maps 606a-606g may have the same or different height, width, and channel depth. Similarly, the stream results 616 may have the same or different size depending on the corresponding convolution and the intended result of the respective convolution stream 601. For example, the stream results 616 may have the same height and width as the feature maps 606 but may have a different channel depth from the feature maps 606 and from each other. For example, the stream result 616a may have a channel depth that corresponds to different classification of objects, the stream result 616b may have a channel depth of one that corresponds to a centerness of an object, and the stream result 616c may include multiple stream results (or feature maps) with different channel depths. For example, the stream result 616c may include results with channel depths of three (e.g., for an object's size), two (e.g., one feature map for each of an object's offset, direction, and velocity), and one (e.g., for an object's depth). It will be understood that the stream results 616 may include fewer or more characteristics as desired.

It will be understood that the detection stage 510 may include fewer or more convolution streams 601, convolutions, task-based feature enrichment stages 508, etc. For example, in some cases, each feature map output by a convolution may be enriched by a task-based feature enrichment stage 508 using a corresponding earlier feature map 612. As another example, in certain cases, only one convolution stream 601 may include a task-based feature enrichment stage 508. As another example, the detection stage 510 may include a distinct convolution for each characteristic. For example, if the stream result 616c includes an object offset, depth, size, rotation, direction, and velocity, the detection stage 510 may include one or more convolutions for each of the object offset, depth, size, rotation, direction, and velocity.

In the illustrated example of FIG. 6A, the first convolution stream 601a includes the convolutions 605a-605d and the task-based feature enrichment stage 508a. The enriched feature map 604 is used as an input for the convolution 605a, and the outputs of the convolution 605a (feature map 606a), convolution 605b (feature map 606b), and convolution 605c (feature map 606c) are used as inputs to the convolution 605b, convolution 605c, and task-based feature enrichment stage 508a, respectively. It will be understood that additional convolutions may be used to generate the feature maps 606a, 606b, and/or 606c, or to generate additional feature maps.

The task-based feature enrichment stage 508a enriches the feature map 606c using the earlier feature map 612a to generate the enriched feature map 614a. As described herein, the task-based feature enrichment stage 508a may enrich the feature map 606c using the earlier feature map 612a in a variety of ways, such as, by concatenating the features of the earlier feature map 612a to the features of the feature map 606c and/or cross-attending the features of the feature map 606c with the features of the earlier feature map 612a, similar to the manner in which task-based feature enrichment stage 506 enriches feature map 602a.

In the illustrated example, the enriched feature map 614a serves as the input to the convolution 605d to generate the stream result 616a. In this example, the stream result 616a is an object classification for objects in the image 502a that indicates a classification for objects and a probability that the classification is correct.

The second convolution stream 601b includes the convolutions 605e-605h and the task-based feature enrichment stage 508b. The enriched feature map 604 is used as an input for the convolution 605e, and the outputs of the convolution 605e (feature map 606d), convolution 605f (feature map 606e), and convolution 605g (feature map 606f) are used as inputs to the convolution 605f, convolution 605g, and task-based feature enrichment stage 508b, respectively. It will be understood that additional convolutions may be used to generate the feature maps 606d, 606e, and/or 606f, or to generate additional feature maps.

The task-based feature enrichment stage 508b enriches the feature map 606f using the earlier feature map 612b to generate the enriched feature map 614b. As described herein, the task-based feature enrichment stage 508b may enrich the feature map 606f using the earlier feature map 612b in a variety of ways, such as, by concatenating the features of the earlier feature map 612b to the features of the feature map 606f and/or cross-attending the features of the feature map 606f with the features of the earlier feature map 612b, similar to the manner in which task-based feature enrichment stage 506 enriches feature map 602a.

In the illustrated example, the enriched feature map 614b serves as the input to the convolution 605h to generate the stream result 616b. In this example, the stream result 616b is an object centerness for objects in the image 502a that indicates a centerness for the objects.

The third convolution stream 601c includes the convolutions 605e, 605f, 605i, and 605j (sharing the convolutions 605e and 605f with the second convolution stream 601b), and the task-based feature enrichment stage 508c. The enriched feature map 604 is used as an input for the convolution 605e, and the outputs of the convolution 605e (feature map 606d), convolution 605f (feature map 606e), and convolution 605i (feature map 606g) are used as inputs to the convolution 605f, convolution 605i, and task-based feature enrichment stage 508c, respectively. It will be understood that additional convolutions may be used to generate the feature maps 606d, 606e, and/or 606g, or to generate additional feature maps.

The task-based feature enrichment stage 508c enriches the feature map 606g using the earlier feature map 612c to generate the enriched feature map 614c. As described herein, the task-based feature enrichment stage 508c may enrich the feature map 606g using the earlier feature map 612c in a variety of ways, such as, by concatenating the features of the earlier feature map 612c to the features of the feature map 606g and/or cross-attending the features of the feature map 606g with the features of the earlier feature map 612c, similar to the manner in which task-based feature enrichment stage 506 enriches feature map 602a.

In the illustrated example, the enriched feature map 614c serves as the input to the convolution 605j to generate the stream result 616c. In this example, the stream result 616c includes an offset, depth, size, rotation, direction, and velocity for objects in the image 502a, as such the convolution 605j may represent multiple convolutions (e.g., at least one convolution for each of offset, depth, size, rotation, direction, and velocity).

The stream results 616 from the detection stage 510 may be used to generate the bounding boxes 512, determine a path for the vehicle 200, and/or control the vehicle 200. For example, the perception system 402 may generate the bounding boxes 512 and communicate the bounding boxes 512 and/or object characteristics to the planning system 404. The planning system 404 may use the bounding boxes 512 and/or object characteristics to generate a navigation plan or path for the vehicle 200 and communicate the navigation plan to the control system 408. The control system 408 may use the navigation plan to control the vehicle to follow the navigation plan or path.

Figure 6B:
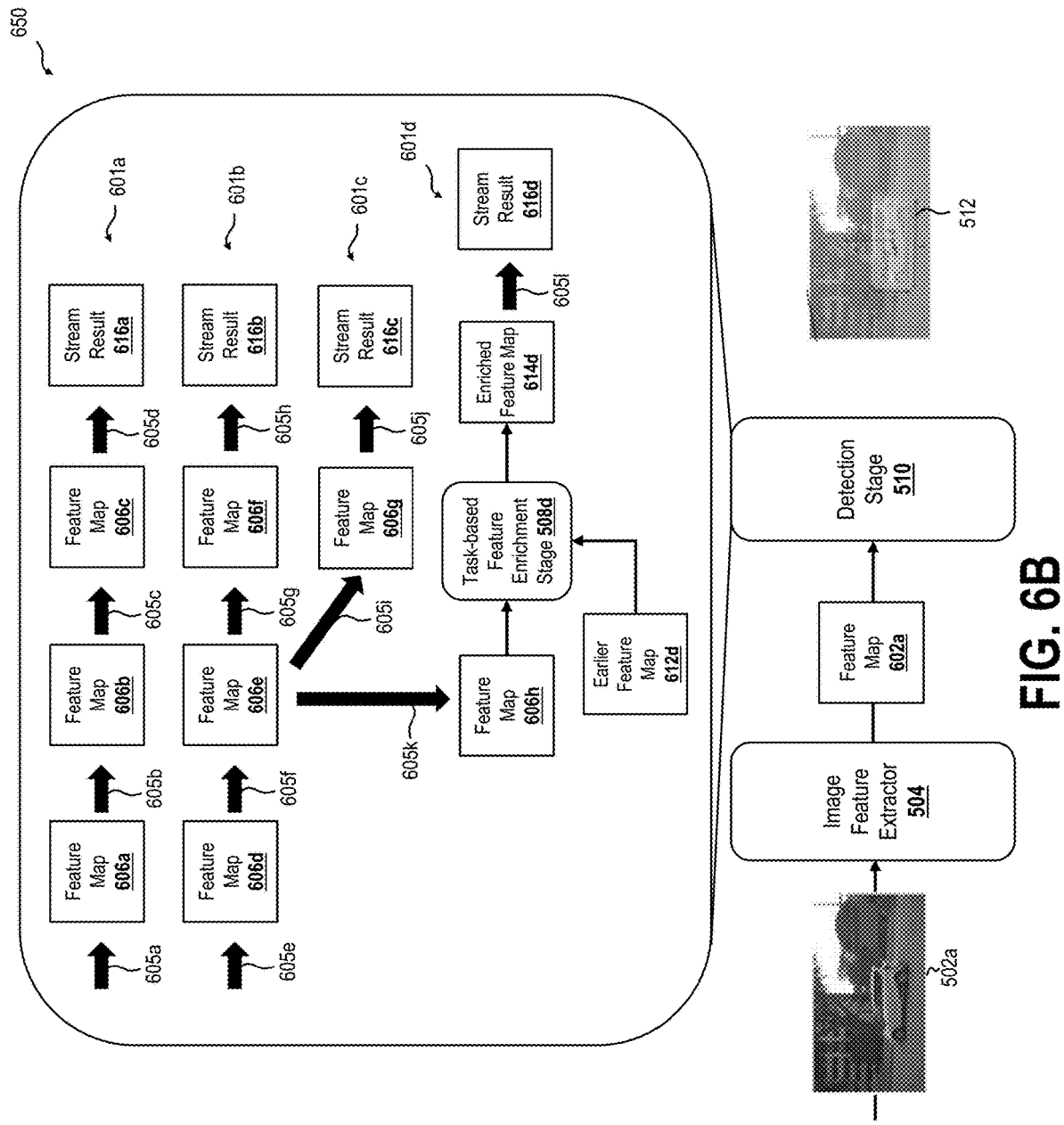

FIG. 6B is a data flow diagram illustrating another example of a perception environment 650 in which the perception system 402 generates object characteristics and/or bounding boxes 512 from the image 502a and image 502b (not shown).

The example perception environment 650 illustrated in FIG. 6B is similar to the example perception environment 600 illustrated in FIG. 6A in some respects and is different in other respects. For example, similar to the perception environment 600, the perception environment 650 includes the image feature extractor 504 that generates the feature map 602a using the image 502a and the detection stage 510. In addition, the detection stage 510 includes multiple convolutions 605 to generate feature maps 606 and stream results 616.

However, the perception environment 650 differs from the perception environment 600 in that the perception environment 650 does not include a task-based feature enrichment stage 506 to enrich the feature map 602a using the feature map 602b. As such, in the perception environment 650, the feature map 602a is used as the input to the detection stage 510 (e.g., the input to the convolution 605a and the convolution 605e) and convolutions are performed on it (rather than on an enriched feature map, such as enriched feature map 604).

With regard to the detection stage 510, in the perception environment 650, the task-based feature enrichment stage 508a, task-based feature enrichment stage 508b, and task-based feature enrichment stage 508c are omitted such that enriched feature map 614a, the enriched feature map 614b, and the enriched feature map 614c are not generated using the earlier feature map 612a, earlier feature map 612b, or earlier feature map 612c, respectively. Accordingly, in the illustrated example of FIG. 6B, the convolution stream 601a, convolution stream 601b, and convolution stream 601c generate the stream result 616a, stream result 616b, and stream result 616c, respectively, without enriching a later feature map using an earlier feature map.

In addition, the detection stage 510 of the perception environment 650 includes a fourth convolution stream 601d. The fourth convolution stream 601d includes the convolutions 605e, 605f, 605k, and 605l (sharing the convolutions 605e and 605f with the second convolution stream 601b and the third convolution stream 601c), and the task-based feature enrichment stage 508d. The feature map 602a is used as an input for the convolution 605e, and the outputs of the convolution 605e (feature map 606d), convolution 605f (feature map 606e), and convolution 605k (feature map 606h) are used as inputs to the convolution 605f, convolution 605k, and task-based feature enrichment stage 508d, respectively. It will be understood that additional convolutions may be used to generate the feature maps 606d, 606e, and/or 606h, or to generate additional feature maps.

In the illustrated example, the convolution 605k may result in a feature map 606h that indicates a depth for objects in the image 502a. In some such cases, the feature map 606h may have a channel depth of one.

The task-based feature enrichment stage 508d enriches the feature map 606h using an earlier feature map 612d to generate the enriched feature map 614d. As described herein with reference to other earlier feature maps 612, the earlier feature map 612d may be generated using the image 502b in a manner similar to the generation of feature map 606h (e.g., by convoluting a feature map based on image 502b using convolution 605e, convolution 605f, and convolution 605k). Moreover, as described herein, the earlier feature map 612d may be generated before the feature map 606h and/or before the perception system 402 receives the image 502a. In some such cases, the earlier feature map 612d may be stored in a buffer or data store by the perception system 402.

As described herein, the task-based feature enrichment stage 508d may enrich the feature map 606h using the earlier feature map 612d in a variety of ways, such as, by concatenating the features of the earlier feature map 612d to the features of the feature map 606h and/or cross-attending the features of the feature map 606h with the features of the earlier feature map 612d. In some cases, the task-based feature enrichment stage 508d may also align objects from the feature maps to account for a velocity of the vehicle 200. By accounting for the velocity of the vehicle 200, the task-based feature enrichment stage 508d may enable the perception system 402 to more accurately determine a velocity of an object in the image 502a based on a depth of the object in the image 502a and image 502b.

In the illustrated example, the enriched feature map 614d is used as the input to the convolution 605l to generate the stream result 616d. In this example, the convolution 605l processes the enriched feature map 614d (that indicates depth of objects in the image 502a) such that it is able to generate a velocity for objects in the image 502a. In this way, the perception system 402 is able to use a depth determination of an object in multiple images to determine a velocity for the object (in the later image). Accordingly, the stream result 616d may include a velocity for objects in the image 502a based on the depth of the objects in different images. Moreover, the channel depth of the stream result 616d may be different from the channel depth of feature map 606h. For example, if the feature map 606h has a channel depth of one (for object depth), the stream result 616d may have a channel depth of two (for object velocity along the x and y axis).

Flow Example

Figure 7:
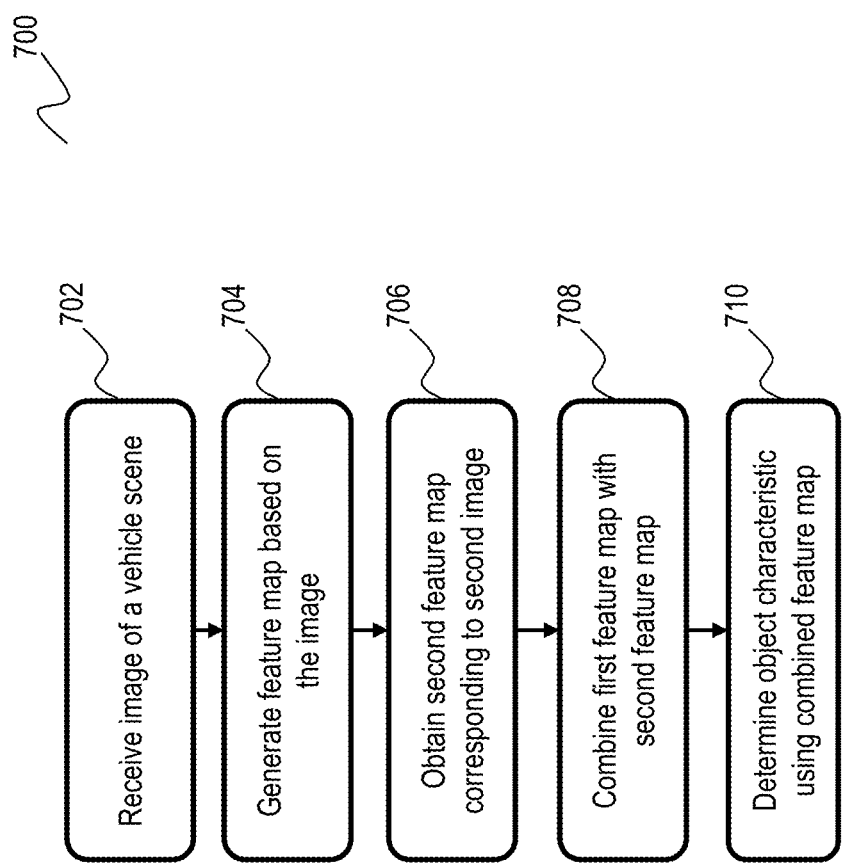
FIG. 7 is a flow diagram illustrating an example of a routine implemented by at least one processor to determine an object characteristic of an object in a vehicle scene.

FIG. 7 is a flow diagram illustrating an example of a routine 700 implemented by at least one processor to determine object characteristics of an object in an image. The flow diagram illustrated in FIG. 7 is provided for illustrative purposes only. It will be understood that one or more of the steps of the routine illustrated in FIG. 7 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components and/or the autonomous vehicle compute 400 may be used.

At block 702, the perception system 402 receives a first image of a vehicle scene. As described herein, the first image may correspond to an image received from an image sensor or cameras located on a vehicle at a particular time.

At block 704, the perception system 402 generates at least one first feature map based on the image. The first feature map(s) may include an array of grid cells having a particular channel depth (e.g., 256, 512, etc.). As described herein, the grid cells may include features indicative of extracted characteristics of the first image, such as but not limited to color, texture, location, reflectivity, shape, edges, etc.

In certain cases, the perception system 402 may generate the first feature map(s) using one or more convolutions. In some cases, the perception system 402 may generate the first feature map(s) using an image feature extractor, such as, but not limited to, Resnet and/or a feature pyramid network (FPN) and/or generate the first feature map(s) as part of a detection stage, such as, but not limited to, a fully convolutional one-stage object detector. For example, with reference to FIGS. 6A and 6B, the first feature map(s) may correspond to a feature map generated by the image feature extractor 504 (e.g., feature map 602a) or correspond to a feature map generated by the detection stage 510 (e.g., feature map 606c, feature map 606f, feature map 606g, and/or feature map 606h).

At block 706, the perception system 402 obtains one or more second feature map(s) corresponding to a second image. As described herein, the second feature map(s) may be earlier feature map(s) stored in a buffer or data store of the perception system 402 and be generated before the first feature map(s) and/or be based on an image received before the first image.

In some cases, the second feature map(s) may have been processed by the perception system 402 in a manner similar to the first feature map(s). For example, if the first feature map(s) is generated by the image feature extractor 504 using the first image (e.g., feature map 602a), the second feature map(s) may be generated by the image feature extractor 504 using the second image (e.g., feature map 602b). As another non-limiting example, if the first feature map(s) is the result of three convolutions of a feature map generated from the first image (e.g., feature map 606c, feature map 606f, feature map 606g, or feature map 606h), the second feature map(s) may be the result of three convolutions of a feature map generated from the second image.

At block 708, the perception system 402 enriches the first feature map(s) (or earlier feature map(s)) using the second feature map(s) (or later feature map(s)). As described herein, the perception system 402 may enrich the first feature map(s) using the second feature map(s) in a variety of ways.

In some cases, the perception system 402 enriches the first feature map(s) by mapping one or more grid cells of the second feature map (also referred to herein as mapped grid cell(s)) to at least one grid cell of the first feature map(s) (also referred to herein as a target grid cell), and using the features of the mapped grid cell(s) of the second feature map to enrich the features of the target grid cell.

As described herein, the grid cells of the second feature map may be mapped to a similarly located grid cell of the first feature map (e.g., grid cell at a particular location of the second feature map mapped to a grid cell at the same location on the first feature map) or the one or more grid cells of the second feature map may be mapped to a grid cell of the first feature map based on a shifting value or other movement estimate. In some cases, the shifting value or other movement estimate may take into account the absolute movement of the object, the absolute movement of the vehicle 200, and/or the relative movement of the object with respect to the vehicle 200.

The perception system 402 may enrich the target grid cell using the features of the mapped grid cell(s) in a variety of ways. In some cases, the perception system 402 may concatenate the features (or semantic data) of the mapped grid cell(s) to features of the target grid cell.

In certain cases, the perception system 402 may cross-attend the features of the mapped grid cell(s) to the target grid cell. As part of cross-attending the features, the perception system 402 may determine a weighting between the mapped grid cell(s) and the target grid cell (e.g., based on a probabilistic relationship between the mapped grid cells and the target grid cell, where the probabilistic relationship may be based on a comparison of the features of the individual mapped grid cells and the target grid cell), weight the features of the mapped grid cell(s) based on the weighting and use the weighted features of the mapped grid cell(s) to modify or enrich the features of the target grid cell. In some such cases, the perception system 402 may also weight the features of the target grid cell and use the weighted features of the target cell as part of the modification/enrichment process. As a non-limiting example, the perception system 402 may weight feature $f_0$ of the target grid cell and mapped grid cells based on the different weighting values and use a combination of the weighted feature $f_0$ of the target grid cell and mapped grid cells to determine a new value for the feature $f_0$ of the target grid cell. In like manner, the perception system 402 may modify some or all of the features $f_1$-$f_n$ of the target grid cell.

At block 710, the perception system 402 determines an object characteristic using the enriched feature map. As described herein, the perception system 402 may determine an object's classification, centerness, offset, depth, size, rotation, direction, and/or velocity based on an enriched feature map. In some cases, to determine the object characteristic, the perception system 402 performs one or more convolutions on the first enriched feature map. For example, with reference to FIG. 6A, if the first enriched feature map corresponds to enriched feature map 604, the perception system 402 may perform multiple convolutions on the enriched feature map 604 to determine an object characteristic. In some such cases, the perception system 402 may or may not generate additional enriched feature maps from the one or more convolutions.

As another example and with reference to FIG. 6A, if the first enriched feature map corresponds to enriched feature map 614c, the perception system 402 may perform multiple convolutions on the enriched feature map 614c to determine an object characteristic or to determine multiple object characteristics. For example, the convolutions may be performed in parallel to generate different object characteristics. In some, the perception system 402 performs different convolutions (e.g., in parallel) to determine the object's offset, depth, size, rotation, direction, and/or velocity.

As yet another example and with reference to FIG. 6B, if the first enriched feature map corresponds to enriched feature map 614d, the perception system 402 may perform one or more convolutions on the enriched feature map 614d to determine one or more object characteristics. For example, a first one or more convolutions may be used to determine an object's depth in the two images and a second one or more convolutions may be used to determine the object's velocity (e.g., based on the depth or difference in depth of the object between the two images). Accordingly, the perception system 402 may perform different convolutions serially to determine the object's depth, and/or velocity, and may use one object characteristic, such as object depth, (or a feature map that indicates one object characteristic) to determine another object characteristic, such as velocity. In some cases, when determining velocity from feature maps that indicate a depth of an object, the perception system 402 may account for the velocity of the vehicle 200 to align the objects from the two images.

Fewer, more, or different steps may be included in the routine 700. In some cases, the perception system 402 may generate one or more bounding boxes for objects in an image based on the determined characteristics and control the vehicle based on the one or more bounding boxes. In certain cases, the perception system 402 may generate one or more bounding boxes for objects in an image based on the determined characteristics, estimate trajectories for the objects in the bounding boxes based on the determined characteristics, determine a path through a vehicle scene based on the estimated trajectories, and control the vehicle to follow on the determined path, etc. For example, the perception system 402 may determine bounding boxes based on the determined characteristics and communicate the bounding boxes to the planning system 404. The planning system 404 may use the bounding boxes to determine a path for the vehicle through a vehicle scene, and the control system 408 may control the vehicle based on the determined path.

As described herein, the blocks of routine 700 may be implemented by one or more components of the vehicle 200. For example, with reference to FIGS. 6A an 6B, blocks 704-708 may be implemented using the image feature extractor 504 and/or the detection stage 510. For example, blocks 704-708 may be implemented by the image feature extractor 504 and task-based feature enrichment stage 506 to generate the enriched feature map 604 or implemented by the detection stage 510 to generate the enriched feature map 614a, the enriched feature map 614b, the enriched feature map 614c, and/or the enriched feature map 614d.

In some cases, some or all of the blocks of routine 700 may be repeated (e.g., before determining the characteristic of the object at block 710). For example, if blocks 702-708 correspond to the generation of an enriched feature map by the task-based feature enrichment stage 506 (e.g., enriched feature map 604), blocks 704-708 may be repeated one or more times to enrich feature maps generated by the detection stage 510. In some cases, blocks 704-708 may be repeated after each convolution (or any subset of convolutions) in the detection stage 510 (e.g., after each convolution 605a-605c, 605e-605g, 605i, and 605k in FIG. 6A or FIG. 6B). In certain cases, blocks 704-708 may be repeated once for a particular convolution stream of the detection stage 510 or may be repeated at least once for some or all of the convolution streams of the detection stage 510 (e.g., as illustrated by the task-based feature enrichment stages 508 in FIG. 6A).

As a non-limiting example and with reference to FIG. 6A, the perception system 402 may generate a third feature map (e.g., feature map 606c, feature map 606f, or feature map 606g) based on the first enriched feature map (e.g., enriched feature map 604), enrich the third feature map with a fourth feature map (e.g., earlier feature map 612a, earlier feature map 612b, or earlier feature map 612c, respectively) to form a second enriched feature map (e.g., enriched feature map 614a, enriched feature map 614b, or enriched feature map 614c, respectively), and determine the characteristic of the object based on the second enriched feature map.

As noted, block 704-708 may be repeated multiple times and may be used to determine different characteristics. For example, if feature map 606c is the third feature map referenced above, the earlier feature map 612 is the fourth feature map, and the enriched feature map 614a is the second enriched feature map, blocks 704-708 may be repeated by the perception system 402 to generate a fifth feature map (e.g., feature map 606f) based on the first enriched feature map (e.g., enriched feature map 604), enrich the fifth feature map with a sixth feature map (e.g., earlier feature map 612b) to form a third enriched feature map (e.g., enriched feature map 614b), and determine a second (at least one) characteristic of the object based on the third enriched feature map. Moreover, as a non-limiting example, blocks 704-708 may be repeated by the perception system 402 to generate a seventh feature map (e.g., feature map 606g) based on the first enriched feature map (e.g., enriched feature map 604), enrich the seventh feature map with an eighth feature map (e.g., earlier feature map 612c) to form a fourth enriched feature map (e.g., enriched feature map 614c), and determine a third (at least one) characteristic of the object based on the fourth enriched feature map. In certain cases, multiple characteristics may be determined based on the enriched feature maps. For example, the perception system 402 may determine an object's offset, depth, size, rotation, direction, and/or velocity based on an enriched feature map. It will be understood that any one or any combination of characteristics determined about the object may be used by the vehicle 200 to generate bounding boxes and/or trajectories for the objects and navigate the vehicle 200 through a vehicle scene.

As described herein, it will be understood that reference to a particular feature map (e.g., first, second, third, fourth, feature maps, etc.), may include reference to multiple feature maps at different feature levels. In some such cases, the processing performed on the identified feature map may happen to each of the feature maps of the different feature levels.

EXAMPLES

Various example embodiments of the disclosure can be described by the following clauses:

Clause 1. A method, comprising: receiving a first image at a first time; generating a first feature map based on the first image; obtaining a second feature map, the second feature map corresponding to a second image received at a second time, wherein the second time is before the first time; enriching the first feature map with the second feature map to form a first enriched feature map; and determining a characteristic of an object in the first image based on the first enriched feature map.

Clause 2. The method of clause 1, wherein generating a first feature map based on the first image comprises generating the first feature map using an image feature extractor that includes a feature pyramid network.

Clause 3. The method of clause 2, further comprising: receiving the second image at the second time; and generating the second feature map based on the second image using the image feature extractor that includes the feature pyramid network.

Clause 4. The method of any of clauses 1-3, further comprising: generating at least one bounding box for the object based on the determined characteristic; and causing a vehicle to be controlled based on the at least one bounding box.

Clause 5. The method of any of clauses 1-4, wherein enriching the first feature map with the second feature map comprises concatenating features of the second feature map with respective features of the first feature map to form the first enriched feature map.

Clause 6. The method any of clauses 1-4, wherein enriching the first feature map and the second feature map comprises: identifying a particular grid cell in the first feature map; identifying a set of grid cells in the second feature map associated with the particular grid cell based on a shifting value; generating a weighting value for each of the set of grid cells relative to the particular grid cell based on a comparison of features of the particular grid cell relative to features of each grid cell of the set of grid cells; weighting at least one feature of each grid cell of the set of grid cells based on the weighting value to provide at least one weighted feature of the each grid cell of the set of grid cells; and modifying at least one feature of the particular grid cell based on the at least one weighted feature of the each grid cell of the set of grid cells.

Clause 7. The method any of clauses 1-4, wherein enriching the first feature map and the second feature map comprises: identifying a first grid cell in the first feature map; identifying a set of grid cells in the second feature map associated with the first grid cell based on a shifting value; generating a set of weighting values for the set of grid cells relative to the first grid cell based on a comparison of features of the first grid cell with features of each grid cell of the set of grid cells, wherein the set of weighting values includes a second weighting value for a second grid cell in the second feature map; weighting at least one feature of the second grid cell based on the weighting value to provide at least one weighted feature of the second grid cell; and modifying at least one feature of the first grid cell based on the at least one weighted feature of the second grid cell.

Clause 8. The method of any of clauses 1-7, wherein determining a characteristic of an object in the first image based on the first enriched feature map comprises: generating a third feature map based on the first enriched feature map; enriching the third feature map with a fourth feature map to form a second enriched feature map, the fourth feature map based on second feature map; and determining the characteristic of the object in the first image based on the second enriched feature map.

Clause 9. The method of clause 8, wherein enriching the third feature map and the fourth feature map comprises concatenating features of the fourth feature map with respective features of the third feature map to form the second enriched feature map.

Clause 10. The method of clause 8, wherein enriching the third feature map and the fourth feature map comprises: identifying a third grid cell in the third feature map; identifying a second set of grid cells in the fourth feature map associated with the fourth grid cell based on a second shifting value; generating a second set of weighting values for the second set of grid cells relative to the third grid cell based on a comparison of features of the third grid cell with features of each grid cell of the second set of grid cells, wherein the set of weighting values includes a fourth weighting value for a fourth grid cell in the fourth feature map; weighting at least one feature of the fourth grid cell based on the weighting value to provide at least one weighted feature of the fourth grid cell; and modifying at least one feature of the third grid cell based on the at least one weighted feature of the fourth grid cell.

Clause 11. The method any of clauses 8-10, wherein the characteristic of the object in the first image comprises a depth of the object.

Clause 12. The method any of clauses 8-10, wherein the characteristic of the object in the first image comprises a classification of the object.

Clause 13. The method any of clauses 8-10, wherein the characteristic of the object in the first image comprises at least one of a centerness, offset, size, rotation, direction, or velocity of the object.

Clause 14. The method of any of clauses 8-13, wherein the characteristic of the object is a first characteristic, the method further comprising: generating a fifth feature map based on the first enriched feature map; enriching the fifth feature map with a sixth feature map to form a third enriched feature map, the sixth feature map based on the second feature map; and determining a second characteristic of the object in the first image based on the third enriched feature map.

Clause 15. The method of clause 14, further comprising: generating a seventh feature map based on the first enriched feature map; enriching the seventh feature map with an eighth feature map to form a fourth enriched feature map, the eighth feature map based on the second feature map; and determining a third characteristic of the object in the first image based on the fourth enriched feature map.

Clause 16. The method of clause 15, further comprising: generating at least one bounding box for the object based on the first characteristic, the second characteristic, and the third characteristic; and causing a vehicle to be controlled based on the at least one bounding box.

Clause 17. A system, comprising: a data store storing computer-executable instructions; and a processor configured to: receive a first image at a first time; generate a first feature map based on the first image; obtain a second feature map, the second feature map corresponding to a second image received at a second time, wherein the second time is before the first time; enrich the first feature map and the second feature map to form a first enriched feature map; and determine a characteristic of an object in the first image based on the first enriched feature map.

Clause 18. The system of clause 17, wherein to determine a characteristic of an object in the first image based on the first enriched feature map, the processor is configured to: generate a third feature map based on the first enriched feature map; enrich the third feature map with a fourth feature map to form a second enriched feature map, the fourth feature map based on second feature map; and determine the characteristic of the object in the first image based on the second enriched feature map.

Clause 19. Non-transitory computer-readable media comprising computer-executable instructions that, when executed by a computing system, causes the computing system to: receive a first image at a first time; generate a first feature map based on the first image; obtain a second feature map, the second feature map corresponding to a second image received at a second time, wherein the second time is before the first time; enrich the first feature map and the second feature map to form a first enriched feature map; and determine a characteristic of an object in the first image based on the first enriched feature map.

Clause 20. The non-transitory computer-readable media of clause 19, wherein to determine a characteristic of an object in the first image based on the first enriched feature map, execution of the computer-executable instructions further cause the computing system to: generate a third feature map based on the first enriched feature map; enrich the third feature map with a fourth feature map to form a second enriched feature map, the fourth feature map based on second feature map; and determine the characteristic of the object in the first image based on the second enriched feature map.

Additional Examples

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method, comprising:
   receiving a first image at a first time;
   generating a first feature map based on the first image;
   obtaining a second feature map, the second feature map corresponding to a second image received at a second time, wherein the second time is before the first time;
   enriching the first feature map with the second feature map to form a first enriched feature map;
   generating a third feature map based on the first enriched feature map;
   enriching the third feature map with a fourth feature map to form a second enriched feature map, the fourth feature map based on the second feature map; and
   determining a characteristic of an object in the first image based on the second enriched feature map.

2. The method of claim 1, wherein generating the first feature map based on the first image comprises generating the first feature map using an image feature extractor that includes a feature pyramid network.

3. The method of claim 2, further comprising:
   receiving the second image at the second time; and
   generating the second feature map based on the second image using the image feature extractor that includes the feature pyramid network.

4. The method of claim 1, further comprising:
   generating at least one bounding box for the object based on the determined characteristic; and
   causing a vehicle to be controlled based on the at least one bounding box.

5. The method of claim 1, wherein enriching the first feature map with the second feature map comprises concatenating features of the second feature map with respective features of the first feature map to form the first enriched feature map.

6. The method of claim 1, wherein enriching the first feature map with the second feature map comprises:
   identifying a particular grid cell in the first feature map;
   identifying a set of grid cells in the second feature map associated with the particular grid cell based on a shifting value;
   generating a weighting value for each of the set of grid cells relative to the particular grid cell based on a comparison of features of the particular grid cell relative to features of each grid cell of the set of grid cells;
   weighting at least one feature of each grid cell of the set of grid cells based on the weighting value to provide at least one weighted feature of the each grid cell of the set of grid cells; and
   modifying the at least one feature of the particular grid cell based on the at least one weighted feature of the each grid cell of the set of grid cells.

7. The method of claim 1, wherein enriching the first feature map with the second feature map comprises:
identifying a first grid cell in the first feature map;
identifying a set of grid cells in the second feature map associated with the first grid cell based on a shifting value;
generating a set of weighting values for the set of grid cells relative to the first grid cell based on a comparison of features of the first grid cell with features of each grid cell of the set of grid cells, wherein the set of weighting values includes a second weighting value for a second grid cell in the second feature map;
weighting at least one feature of the second grid cell based on the second weighting value to provide at least one weighted feature of the second grid cell; and
modifying at least one feature of the first grid cell based on the at least one weighted feature of the second grid cell.

8. The method of claim 1, wherein enriching the third feature map with the fourth feature map comprises concatenating features of the fourth feature map with respective features of the third feature map to form the second enriched feature map.

9. The method of claim 1, wherein enriching the third feature map with the fourth feature map comprises:
identifying a third grid cell in the third feature map;
identifying a second set of grid cells in the fourth feature map associated with a fourth grid cell based on a second shifting value;
generating a second set of weighting values for the second set of grid cells relative to the third grid cell based on a comparison of features of the third grid cell with features of each grid cell of the second set of grid cells, wherein the second set of weighting values includes a fourth weighting value for the fourth grid cell in the fourth feature map;
weighting at least one feature of the fourth grid cell based on the fourth weighting value to provide at least one weighted feature of the fourth grid cell; and
modifying at least one feature of the third grid cell based on the at least one weighted feature of the fourth grid cell.

10. The method of claim 1, wherein the characteristic of the object in the first image comprises a depth of the object.

11. The method of claim 1, wherein the characteristic of the object in the first image comprises a classification of the object.

12. The method of claim 1, wherein the characteristic of the object in the first image comprises at least one of a centerness, offset, size, rotation, direction, or velocity of the object.

13. The method of claim 1, wherein the characteristic of the object is a first characteristic, the method further comprising:
generating a fifth feature map based on the first enriched feature map;
enriching the fifth feature map with a sixth feature map to form a third enriched feature map, the sixth feature map based on the second feature map; and
determining a second characteristic of the object in the first image based on the third enriched feature map.

14. The method of claim 13, further comprising:
generating a seventh feature map based on the first enriched feature map;
enriching the seventh feature map with an eighth feature map to form a fourth enriched feature map, the eighth feature map based on the second feature map; and
determining a third characteristic of the object in the first image based on the fourth enriched feature map.

15. The method of claim 14, further comprising:
generating at least one bounding box for the object based on the first characteristic, the second characteristic, and the third characteristic; and
causing a vehicle to be controlled based on the at least one bounding box.

16. A system, comprising:
a data store storing computer-executable instructions; and
a processor configured to:
receive a first image at a first time;
generate a first feature map based on the first image;
obtain a second feature map, the second feature map corresponding to a second image received at a second time, wherein the second time is before the first time;
enrich the first feature map and the second feature map to form a first enriched feature map; and
generate a third feature map based on the first enriched feature map;
enrich the third feature map with a fourth feature map to form a second enriched feature map, the fourth feature map based on the second feature map; and
determine a characteristic of an object in the first image based on the second enriched feature map.

17. Non-transitory computer-readable media comprising computer-executable instructions that, when executed by a computing system, causes the computing system to:
receive a first image at a first time;
generate a first feature map based on the first image;
obtain a second feature map, the second feature map corresponding to a second image received at a second time, wherein the second time is before the first time;
enrich the first feature map and the second feature map to form a first enriched feature map;
generate a third feature map based on the first enriched feature map;
enrich the third feature map with a fourth feature map to form a second enriched feature map, the fourth feature map based on the second feature map; and
determine a characteristic of an object in the first image based on the second enriched feature map.

* * * * *